Aug. 29, 1961     J. B. JONES ET AL     2,998,391
AEROSOLIZATION UNIT

Filed May 24, 1957     2 Sheets-Sheet 2

Fig.2.

INVENTORS.
JAMES BYRON JONES
JOHN L. STRAUGHN
BY WILLIAM B. TARPLEY Jr.

Arthur H. Seidel
ATTORNEY.

United States Patent Office 2,998,391
Patented Aug. 29, 1961

2,998,391
AEROSOLIZATION UNIT
James Byron Jones, John L. Straughn, and William B. Tarpley, Jr., West Chester, Pa., assignors to Aeroprojects, Inc., West Chester, Pa., a corporation of Pennsylvania
Filed May 24, 1957, Ser. No. 661,360
25 Claims. (Cl. 252—305)

The present invention relates to an aerosolization unit for aerosolizing liquids into finely divided particles within a narrow particle size range, and more particularly, to an assembly for aerosolizing liquids, especially liquids which decompose when heated to a temperature sufficient to effect their aerosolization, in which close control of the particle sizes may be affected, and in which recycling of oversize liquid particles may be accomplished. Moreover, the present invention also relates to a process for aerosolizing liquids into aerosols whose particle sizes are closely regulated within a narrow particle size range.

True aerosols have a particle size range of the order of 60 microns in diameter, or smaller; preferably below 10 microns, and represent an intermediate stage between the coarsely dispersed state and the atomic or molecular particle size incident to complete vaporization. Additional working features are provided by this subdivision of materials in the finest possible form without complete vaporization, since the aerosol has attributes of both non-vapor and vapor states. Decreased particle size prolongs the life, and therefore, effectiveness, of these colloidal systems, their persistence being less endangered by the settling and agglomeration-settling tendencies of larger, heavier particles. In addition, other characteristics of aerosols, particularly liquid aerosols, are appropriate and useful for specific purposes: their tendency to move even in still air (Brownian movement), their possible ionization, their possession of distinct properties not readily apparent in the original state of the dispersed material.

This selective atomization is useful to science and industry for applications requiring increased surface area. It has been determined that the increased surface area created when dealing with liquids, for example, is inversely proportional to the diameter of the atomized drop; an increase of such magnitude that it is difficult to appreciate readily, but one which has great significance in the hastening of physical or chemical processes involving heat or mass transfer between liquid and gas phases, since these transfer coefficients also increase as drop size decreases.

The aerosolization of many liquids has not proved satisfactory. Thus, for example, the aerosolization of relatively viscous nonionic liquid surface active agents like the fatty acid esters of sorbitol, and the polyoxyethylene fatty acid derivatives thereof, is difficult; as these agents are adversely affected at those elevated temperatures sufficient to reduce their viscosity to a level at which facile aerosolization is feasible. Many other liquids and emulsions comprising an organic compound and other substances are subject to char or deleterious chemical changes due to heat, even at temperatures below the boiling point of the organic compound, or other substance.

In particular, particle size regulation within narrow limits has been found to furnish more even distribution of liquid upon materials to which the aerosolized liquid particles are applied. For example, in the treatment of fabrics by the exposure of such fabrics to a stream of aerosolized particles, the efficacy of the treatment is frequently dependent upon the uniformity of the particle sizes in the stream of aerosolized particles to which the fabric is exposed.

The number of uses to which aerosolized particles may be put is substantially infinite. Examples of uses to which aerosolized particles of controlled size may be put, in which the regulation of the size of the particles is reflected in the efficacy of the process include the following: the coating of farm products with liquids, the coating of solders and tinning agents upon metals, the coating of metals with anticorrosive agents, the application of water-resistant coatings, the coating of a wide variety of materials with insecticides and/or fungicides, the finishing of a wide variety of fabrics with a wide variety of treating agents, the deposition of polishes and/or pigments upon a wide variety of materials, etc. In each instance the control of particle size uniformity and fineness will permit more uniform coatings, and therefore a more satisfactory product. Not only may the unit of the present invention be utilized for the coating of articles with aerosol particles, but it may be utilized for the disassociation of mixtures into emulsions, and the homogenization of liquid-liquid and liquid-solid systems.

An object of the present invention is to provide a high-efficiency method by which aerosols may be produced, which aerosols are particularly characterized by the fineness of droplets, with especial reference to the formation of aerosols of liquids in a wide range of surface tensions and viscosities.

It is a further object of the present invention to provide a method by which production of aerosols of stated charactersistics may be carried on economically and by which droplets of desired particle sizes may be produced in large quantities and at high rates.

It is another object of the present invention to provide a method for aerosolizing liquids, which have relatively high viscosity, surface tension or other properties, whose change with increased temperature makes aerosolization more facile.

It is a still further object of the present invention to provide a method for aerosolizing a liquid at an elevated temperature, which liquid is, or may be, deleteriously affected at such elevated temperature.

It is yet another object of the present invention to provide an apparatus assembly for producing aerosols which are particularly characterized by the fineness of the droplet size, with especial reference to the formation of aerosols of liquids in a wide range of surface tensions and viscosities.

It is still another object of the present invention to provide apparatus for aerosolizing a liquid in which close control of the liquid's aerosolization may be effected.

It is another object of the present invention to provide a method for aerosolizing a liquid into fine droplets in which substantially all of the liquid is discharged from the system in the form of aerosol droplets.

It is a yet further object of the present invention to provide apparatus for producing aerosols in which substantially all of a liquid charge is converted into aerosol droplets.

For the purpose of illustrating the invention there is shown in the drawings a form which is presently preferred; it being understood, however, that this invention is not limited to the precise arrangements and instrumentalities shown.

FIGURE 2 is a sectional view of a suitable nozzle embodiment which may be used in the present invention.

Figure 1:
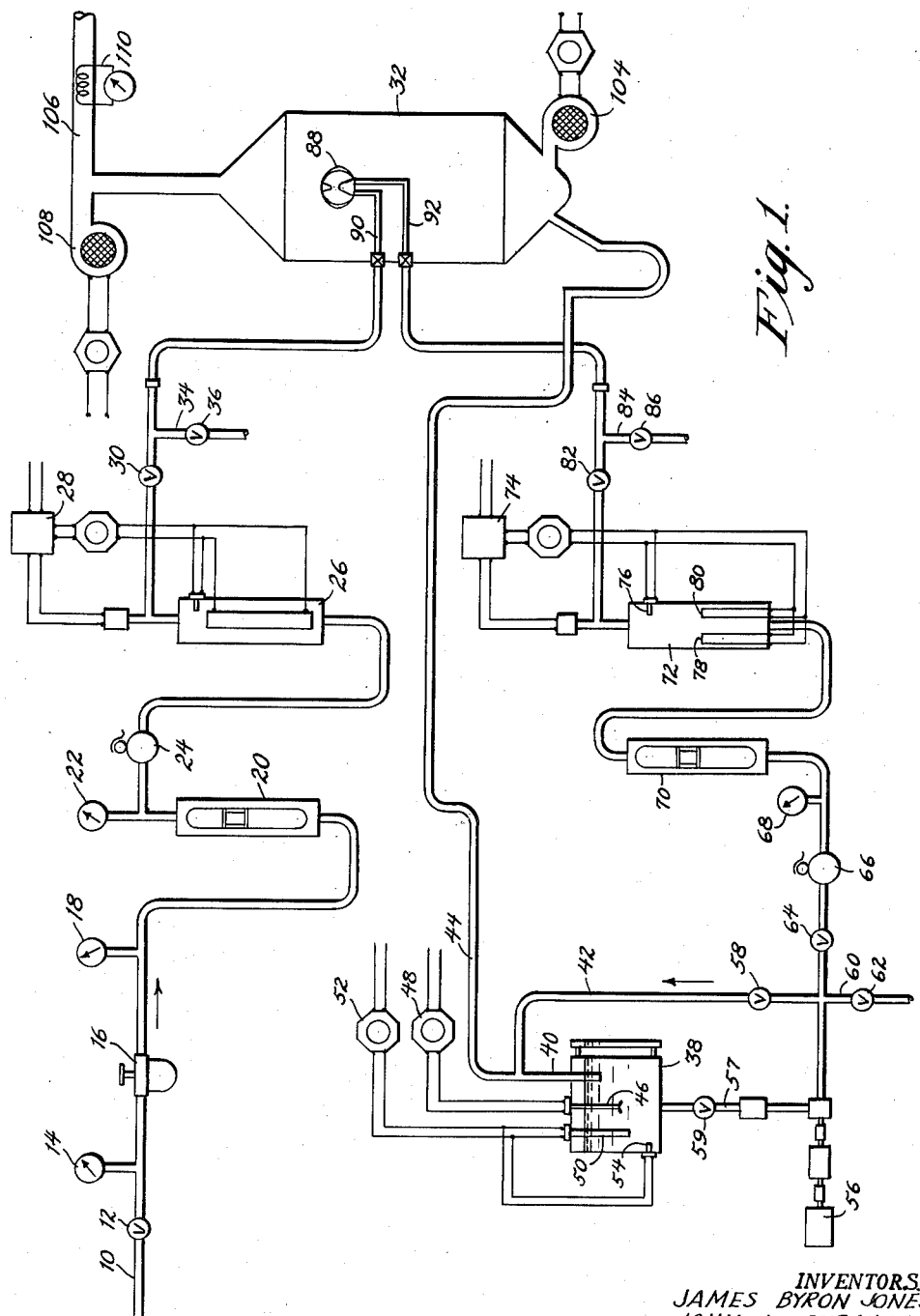
FIGURE 1 is a schematic flow sheet of one apparatus embodiment of the present invention.

Referring to the drawings, and initially to FIGURE 1, the aerosolizing gas which in a preferred embodiment is an inert gas such as nitrogen, nitrous oxide, carbon dioxide, helium, gaseous hydrocarbons such as propane, halogenated hydrocarbon derivatives such as dichlorodifluoromethane, methyl chloride, trichloromonofluoromethane, and in some cases air, which is nonreactive with the liquid being aerosolized, but which may in other embodiments be a gas which reacts with or chemically affects the liquid being aerosolized, such as oxygen, ammonia, steam, hydrogen, etc., where such chemical reaction is of value, is introduced into the system through line 10. The aerosolizing gas is passed through valve 12, pressure meter 14 and gas strainer 16 wherein the gas pressure is adjusted to the desired level, preferably a pressure of above 1.5 atmospheres, the pressure level being visually noted by gage 18. From gage 18 the aerosolizing gas is passed to a gas flow gage 20 wherein its rate of flow is regulated and from thence through gas pressure gage 22, and pressure release valve 24 into heater 26.

Preferably, heater 26 is provided with automatic instrumentation designated by the numeral 28 for regulating the heating of the gas in line 10. Thus, the means 28 may be made responsive to the gas rate flow, the gas pressure, etc. and may be varied in order to conform with variations in the type of liquid being aerosolized, the requisite operating temperature differing with differing liquids. From heater 26 the gas passes through valve 30 and thence may be conveyed into aerosolization chamber 32. A diversion line 34 having a valve 36 is provided to permit diversion of aerosolizing gas from line 10, where such diversion is required for materials balance or to vent gas to the atmosphere when not aerosolizing, in order to avoid overheating of the gas.

The liquid to be aerosolized, and by "liquid" as used herein is meant to include liquid compounds, molten solids, solutions, and mixtures of liquids ranging from immiscible liquid systems to true solutions, and including slurries, collodial systems and emulsion systems, such as normally liquid organic compounds and inorganic compounds containing surface active agents, pure organic compounds such as liquid hydrocarbons, alcohols, amines, esters, etc., pure inorganic compounds such as water, melted aluminum nitrate or phosphoric acid, and aqueous solutions and emulsions, etc. is furnished to the system from a liquid source.

As will be more fully set forth hereinbelow the process of the present invention is also applicable to the aerosolization of liquids whose viscosities at temperatures at which such liqiuds are adversely affected are somewhat too high for aerosolization, but whose viscosity at a temperature somewhat above such temperatures is sufficiently low to permit aerosolization. As above-noted, depending upon the use to which the subject process is put, the liquid may or may not be reactive with the aerosolizing gas. Where the process constitutes the aerosolization of a liquid surface active agent such as a liquid sorbitan ester like sorbitan monooleate (Span 80 sold by Atlas Powder Company, Wilmington, Delaware, under its trademark Span 80); or polyoxyethylene sorbitan monolaurate (Tween 20 sold by Atlas Powder Company, Wilmington Delaware, under its trademark Tween 20); or polyoxyethylene sorbitan trioleate (Tween 85 sold by Atlas Powder Company, Wilmington, Delaware, under its trademark Tween 85); or polyoxyethylene lauryl ether (Brij 30 sold by Atlas Powder Company, Wilmington, Delaware, under its trademark Brij 30); or polyoxyethylene alkyl aryl ether (G–1690 sold by Atlas Powder Company, Wilmington, Delaware, under its trademark G–1690); or any other of the non-ionic surface active agents sold by the Atlas Powder Company of Wilmington, Delaware, under its trademarks "Span" or "Tween"; or glycerol; or sorbitol; or silicone oils; or aqueous inorganic salt solutions; or liquid mixtures or solutions of alcohols, esters, amines, carboxylic acids, etc. in which no reaction is desired between the liquid and the aerosolizing gas, the aerosolizing gas should be an inert one; that is a gas which does not react with the liquid under the conditions of aerosolization. The process of the present invention is also applicable to instances where reaction between the aerosolizing gas and the liquid undergoing aerosolization is desired. Examples of such processes include: oxidation reactions such as the formation of oxygenated compounds from olefins; the formation of acetic acid from acetaldehyde; and the combustion of hydrocarbons at elevated temperatures. Other reactions include the nitriding of magnesium, etc.

A variety of examples will be described in detail below.

In the illustrated embodiment the liquid source comprises vessel 38 which is furnished with liquid from pipe 40, such liquid being furnished from fresh liquid charge pipe 42 and recycle liquid pipe 44. The liquid within vessel 38 may be agitated, as desired, by means of stirrer 46 which may be automatically controlled by control means designated 48. The liquid within vessel 38 may be warmed or heated, the requisite degree of agitation or heating being varied to fit the widely different liquids which may be aerosolized in accordance with the present invention, by heater 50. The requisite degree of heating may be controlled by means 52 which is responsive to thermocouple 54 immersed within vessel 38. The conveying of liquid through line 57 and valve 59 may be accomplished by means of pump 56. Recycling of the liquid from line 57 through line 42 and valve 58 may be accomplished by opening valve 58; or, if desired, a portion of the liquid in line 57 may be diverted through line 60 and valve 62. The liquid in line 57 passes through valve 64, safety valve 66 and pressure meter 68. From pressure meter 68 the liquid is conveyed through a liquid flow meter 70, which may be a rotameter, and thence into a liquid heater 72 wherein the liquid is heated to a requisite temperature permitting it to be aerosolized. The requisite amount of heat to be transferred to the liquid in heater 72 depends upon the nature of the liquid. Thus, the aerosolization of liquids is primarily a function of the liquid's viscosity and surface tension. In cases where the viscosity of the liquid at ambient or room temperature conditions is such as to permit its facile aerosolization, both heater 50 and heater 72 may be eliminated.

Heater 72 may be closely regulated by means of control means 74 which may utilize thermocouples 76 for sensing the temperature of the liquid passing through heater 72. Heat is conveyed to the liquid passing through heater 72 by means of heating elements 78 and 80 which are directly connected to control means 74.

The use of a pair of heaters, such as heater 50 and heater 72, with heater 50 being in essence a preheater, greatly facilitates the extent of control which may be exercised over the liquid being aerosolized. Thus, if the liquid is one which chars or is decomposable at a temperature proximating that which is needed to reduce its viscosity to a level making its aerosolization possible, the liquid can be first heated by means of preheater 50 to a temperature level below the temperature level required for aerosolization, and after the liquid's pressure and rate of flow have been adjusted, the liquid may be heated to the temperature level required for aerosolization in heater 72.

Inasmuch as heater 72 is immediately before the aerosolization chamber 32, the liquid is maintained at this temperature level for but a relatively small period of time, namely a time period sufficiently short to enable the liquid to be transferred to the aerosolization chamber 32 and to be aerosolized without any appreciable adverse affect upon the liquid. In a preferred embodiment of the present invention the liquid is heated in heater 72 to a temperature just beneath that temperature at which it chars or undergoes decomposition, and the aerosolizing gas from line 10 is heated to a temperature above the temperature at which the liquid undergoes decomposition. In this manner, the liquid is raised to a temperature level sufficiently high to adversely affect it only in aerosolization chamber 32, and for the briefest period of time, and the hot gas momentarily carrying the temperature above the decomposition point drastically reduces the viscosity and surface tension of the liquid. This permits aerosolization and when it is followed by rapid chilling in accordance with the process of the present invention, decomposition of the aerosolized droplet or other adverse effect is prevented. From heater 72 the liquid passes through valve 82 and thence into aerosolization chamber 32. A diversion line 84 is provided intermediate valve 82 and aerosolization chamber 32 whereby, if desired, a portion of the liquid in line 57 may be diverted. Valve 86 is provided in line 84.

The aerosolization chamber 32 may comprise any means for generating aerosols within a narrow size range of aerosol droplets, and capable of producing a high percentage of aerosol droplets of very small diameter. The aerosolization chamber and nozzle which is illustrated in the drawings, and which forms the subject matter of copending patent application Serial No. 661,432 filed on even date herewith for Aerosolization Apparatus and Aerosolization Process, in the name of William B. Tarpley, Jr., et al., is a preferred apparatus embodiment for producing aerosols. This aerosolization chamber 32 is provided with a generator designated by the numeral 88 positioned in the central portion thereof.

In place of the nozzle means 26 shown herein the nozzle described in copending Serial No. 632,332 filed on January 3, 1957 for Process for Generating Aerosols and Apparatus Therefor in the name of James Byron Jones, now Patent No. 2,929,563, which utilizes a gas barrier may be substituted.

Generator 88 includes a conduit 90 which is an extension of conduit 10 and mates therewith. As seen in FIGURE 2 conduit 92 enlarges into a chamber 93 having a tubular outlet 94 concentrically embracing tubular outlet 96 of conduit 90. A barrier designated 98 is retained by means of yoke 100 at a spaced axial distance from the outlet of generator 88. The face 102 of barrier 98 is juxtaposed to the outlets 96 and 94 of conduits 90 and 92. The aerosolizing gas, which as heretofore noted is pressurized to above 1.5 atmospheres, and preferably is pressurized to above 1.7 atmospheres issues through the outlet 96 at a supersonic or nearly supersonic velocity, drawing the liquid from outlet 94 about it. As the gas stream carrying the liquid approaches barrier 98 it is drastically distorted from a unidirectional or axial stream into a substantially radial or disc-like pattern radiating outwardly of the axial flowing stream. The sleeve-like mass of partially disrupted liquid, having a higher unit mass than the gas stream, impinges into the gas stream, where maximum distortion thereof is taking place and is further broken down. We have found, that when liquids are properly fed into a distorted, high-velocity, gas stream, exceedingly fine aerosols are generated, which aerosols comprise particles of substantially uniform diameter.

The generator 88 is spaced from the inner wall surface of aerosolization chamber 32 a sufficient distance so that separation of the aerosolized particles from any relatively large particles is effected by combined gravity, impingement and cyclonic actions, with the relatively large particles falling downwardly or forming a downwardly traveling film on the inner wall surface of aerosolization chamber 32. The diameter of chamber 32 should bear a relationship to the liquid spray pattern diameter such that impingement of any large particles produced will occur, but drag forces will preferentially slow smaller particles prior to impingement. The large particles are collected near the base of aerosolization chamber 32 and may be recycled through pipe 44 to vessel 38.

Additional gas may be added tangentially to aerosolization chamber 32 through blower 104, such gas traveling upwardly and out of the aerosolization chamber 32 through duct 106. A further blower 108 may be positioned within duct 106 for conveying the aerosol particles out of aerosolization chamber 32 through duct 108.

The blowers 104 and 108 may be associated with heating means whereby the gas stream discharged therefrom may be at the same or higher or lower temperature than the temperature of the gas discharged from outlet 96.

Preferably, at least blower 104 is associated with a heater. If the blower 104 utilizes gas of the same as or lower temperature than the liquid rapid cooling of the liquid in the region of nozzle 88 will result.

In one preferred embodiment, cooled gas is introduced into chamber 32 to rapidly lower the temperature of the aerosol droplets formed within chamber 32. This embodiment has maximum utility where it is necessary to heat the aerosolized liquid to a temperature above its decomposition temperature prior to aerosolization.

The gas discharged from blowers 104 and 108 is preferably the same as the gas discharged from tubular outlet 96, although in some cases the gas discharged from these blowers may have a different chemical composition than the gas discharged from tubular outlet 96.

A heater 110 or other means for conditioning the aerosol particles formed by the apparatus of the present invention may be provided in duct 106.

The subject apparatus has been used to aerosolize a wide variety of liquids, as has heretofore been mentioned. Its use will be exemplified by the following examples which deal with the aerosolization of liquid members of the class of non-ionic surface active agents sold by the Atlas Powder Company of Wilmington, Delaware under the designation "Span," such as sorbitan monolaurate, sorbitan monooleate, and sorbitan trioleate, and the liquid surface-active materials designated "Tweens," namely polyoxyethylene sorbitan monopalmitate, polyoxyethylene sorbitan monostearate, polyoxyethylene sorbitan monooleate, polyoxyethylene sorbitan trioleate, etc., and also with a wide variety of other liquids (which term includes molten solids).

For example, "Tween 20" was aerosolized in accordance with the present invention. Tween 20 is a polyoxyethylene sorbitan monolaurate and is an oily liquid having a molecular weight of about 1200, a viscosity of between about 250 and 400 centipoises at 25° C., a specific gravity of between about 1.08 to 1.03, a flash point of 610° F. and a fire point of 655° F. A solution of 5.0 to 0.001 weight percent of this material in distilled water has a surface tension of 35 to 50 dynes per centimeter.

*Example I*

Whe have found that with Tween 20, using an air pressure of 100 pounds per square inch and an air temperature of 300° F. and heating the Tween 20 in stages, namely first warming it by means of preheater 50 and then heating it by means of heater 72 to a temperature of 200° F. (such temperature being a temperature just below that at which Tween 20 chars), the resultant mean mass diameter of the aerosol is 6 microns. However, using an air pressure of 200 pounds per square inch and an air temperature of 300° F. and heating the Tween 20 first to 200° F. by means of preheater 50 and then heating the Tween 20 to a temperature of 270° F. in heater 72 (above the char temperature of Tween 20) but rapidly conveying it to be aerosolized, the time during which it was heated to 270° F. being less than that which permits charring or decomposition to be effected, a mean mass diameter of 2.5 microns for the resultant aerosol is obtained.

We have further found that using the generator shown in the drawings and operating in the manner above-indicated namely with the air temperature being higher than the decomposition temperature of Tween 20 so that heating for a very brief time is obtained in aerosolization chamber 32, with the viscosity of the Tween 20 being reduced by raising its temperature in heater 72 to a temperature just below the temperature at which it chars, or by raising its temperature above a temperature at which it chars for a very short time period in heater 72, aerosolization of the Tween 20 to aerosol particles within a narrow size range, and of very small average diameter, may be accomplished with less than 20% of the Tween 20 being recycle. The recycled Tween 20 is not decomposed or adversely effected to any appreciable extent, and may safely be transmitted to aerosol chamber 32 after once again passing from vessel 38 through line 57.

Example II

Elemental sulphur obtained as chemically pure sulphur which had a melting point of between 220° F. and 230° F. was aerosolized in accordance with the present invention at a temperature of between 290° F. to 300° F. with nitrogen. The nitrogen pressure at the instant of aerosolization was one hundred pounds per square inch and its temperature 400° F.

Under the aforesaid conditions aerosolized sulphur particles were obtained of which ninety weight percent had a particle size of less than twenty microns.

Example III

A bismuth alloy consisting of 38.4 weight percent of bismuth, 30.8 weight percent of lead, 15.4 weight percent of tin, and 15.4 weight percent of cadmium which had a melting point of 158° F. was aerosolized in accordance with the present invention at a temperature of between 275° F. to 300° F. using nitrogen as the aerosolizing gas. The nitrogen pressure was one hundred pounds per square inch and the nitrogen temperature was 400° F.

Under the aforesaid conditions aerosolization of the bismuth alloy was achieved to the extent that ninety weight percent of the aerosolized particles had a particle size of less than fifteen microns.

Example IV

Carbowax 4000, which is a polyethylene glycol water soluble wax having a melting point of 127° F. to 133° F. was aerosolized at 200° F. with air. The air pressure at aerosolization was one hundred pounds per square inch and the air temperature 350° F.

Under the aforesaid conditions aerosolization of the Carbowax 4000 was achieved to the extent that ninety weight percent of the aerosolized particles had a particle size of less than ten microns.

Example V

Yellow beeswax which had a melting point of between 143° F. to 149° F. and a flash point of 450° F. was aerosolized at 175° F. with air. The air pressure was one hundred pounds per square inch and the air temperature at aerosolization was 400° F.

Under the aforesaid conditions ninety weight percent of the aerosolized particles lay in the particle size range of from one to five microns.

Example VI

Pentaerythritol, a polyhydroxy organic solid related to sugars, which had a melting point of between 340° F. to 350° F. was aerosolized at 510° F. to 520° F. with nitrogen. The nitrogen pressure at aerosolization was one hundred pounds per square inch and the nitrogen temperature at aerosolization was 380° F.

Under the aforesaid conditions ninety weight percent of the aerosolized particles had a size of less then ten microns.

Example VII

A polyethylene wax having the molecular weight of about 2,000, a melting point of 210° F. to 220° F., and a viscosity of between fifty and one hundred centipoises at 400° F. was pumped as a liquid at 320° F. to 330° F. and aerosolized at 425° F. to 450° F. with air. The air pressure was one hundred pounds per square inch at aerosolization and the air temperature 400° F.

Under the aforesaid conditions ninety weight percent of the aerosolized particles had a size of less than three to four microns.

Example VIII

A hard wax mixture comprising a mixture of 83.3 weight percent of Atmul 84, a glycerine monostearate, 11.7 weight percent of Span 60, a sorbitol monostearate, and 5.0 weight percent of Tween 60, a polyoxyethylene sorbitan monostearate having a melting point of 150° F. was aerosolized at 225° F. to 235° F. with air. The air pressure at aerosolization was ninety to one hundred and ten pounds per square inch and the air temperature 340° F.

Under the aforesaid conditions ninety weight percent of the aerosolized particles had a size of less than five microns.

Example IX

A glycerine monostearate wax having a melting point of about 150° F. was aerosolized at 225° F. with air. The air pressure at aerosolization was one hundred pounds per square inch and the air temperature 300° F.

Under the aforesaid conditions ninety weight percent of the aerosolized particles had a size of less than fifteen microns.

Example X

Stearic acid having a melting point of 160° F. was aerosolized with air at 300° F. The air pressure at aerosolization was one hundred pounds per square inch and the air temperature 400° F.

Under the aforesaid conditions ninety weight percent of the aerosolized particles had a size of less than ten microns.

Example XI

Carnauba wax having a melting point of 170° F. to 190° F. was aerosolized at 250° F. with air. The air pressure at aerosolization was one hundred pounds per square inch and the air temperature 300° F.

Under the aforesaid conditions ninety weight percent of the aerosolized particles had a particle size of less than 10 microns.

Example XII

DDT (dichloro-diphenyl-trichloroethane) having a melting point of 160° F. to 230° F. was aerosolized at 250° F. to 275° F. with nitrogen. The nitrogen pressure at aerosolization was one hundred pounds per square inch and the nitrogen temperature was 350° F.

Under the aforesaid conditions ninety weight percent of the aerosolized particles had a particle size of less than five microns.

Example XIII

Cardis-1, an emulsifiable oxidized microcrystalline petroleum wax having a melting point of 195° F. to 200° F. was aerosolized at 275° F. with air. The air pressure at aerosolization was one hundred pounds per square inch and the air temperature 400° F.

Under the aforesaid conditions ninety weight percent of the aerosolized particles had a particle size of less than about five to ten microns.

Example XIV

A commercial hydrogenated shortening comprising hydrogenated triglycerides of saturated and unsaturated fatty acids, was aerosolized at 190° F. 210° F. with air. The air pressure at aerosolization was one hundred pounds per square inch and the air temperature 340° F.

Aerosolization into discrete particles was achieved by the introduction of cooled air into aerosolization chamber 32 from blower 104.

Under the aforesaid conditions ninety weight percent of the aerosolized particles had a size of less than ten microns.

Example XV

A wax made up of sixty weight percent of hard glycerol monostearate designated Atmul 84 and forty weight percent of plastic glycerol monostearate designated Atmul 80, which had a melting point of between 140° F. to 150° F., was aerosolized at 220° F. with air. The air pressure at aerosolization was one hundred pounds per square inch and the air temperature 200° F.

Under the aforesaid conditions ninety weight percent of the aerosolized particles had a size of less than fifteen microns.

Example XVI

Tricresyl phosphate was aerosolized at a temperature of 195° F. to 210° F. using air which had been heated to a temperature of 340° F. under a pressure of one hundred pounds per square inch gauge.

Example XVII

Atlas 70% sorbitol solution in water was aerosolized at a temperature of 210° F. to 220° F. using air which had been heated to a temperature of 410° F. to 420° F. under a pressure of one hundred pounds per square inch gauge.

Example XVIII

Carbowax 300 was aerosolized at a temperature of 175° F. using air which had been heated to a temperature of 300° F. under a pressure of one hundred and twenty-five pounds per square inch gauge.

Example XVIX

Silicone oil having a viscosity of twenty centipoises was aerosolized at a temperature of 200° F. using air which had been heated to a temperature of 300° F. under a pressure of one hundred and twenty-five pounds per square inch gauge.

Example XX

Butyl benzyl phthalate was aerosolized at a temperature of 150° F. using air which had been heated to a temperature of 250° F. under a pressure of one hundred and twenty-five pounds per square inch gauge.

Example XXI

Five percent solution of cellulose acetate in ethylene dichloride-methylene chloride was aerosolized at a temperature of 75° F. using air which had been heated to a temperature of 75° F. (room temperature) under a pressure of one hundred and fifty-five pounds per square inch gauge.

Example XXII

Phenol formaldehyde resin-water solution and slurry was aerosolized at a temperature of 75° F. using air which had been heated to a temperature of 75° F. under a pressure of one hundred and twenty-five pounds per square inch gauge.

Example XXIII

Fuel oil #2 was aerosolized at a temperature of 250° F. using air which had been heated to a temperature of 75° F. under a pressure of one hundred and twenty pounds per square inch gauge to one hundred and forty pounds per square inch gauge.

Example XXIV

Fuel oil #5 was aerosolized at a temperature of 75° F. using air which had been heated to a temperature of 75° F. under a pressure of one hundred and twenty-five pounds per square inch gauge.

Example XXV

Bunker C #6 fuel oil was aerosolized at a temperature of 120° F. to 210° F. using air which had been heated to a temperature of 75° F. under a pressure of one hundred and twenty pounds gauge to one hundred and forty pounds per square inch gauge.

The present invention may be embodied in other specific forms without departing from the spirit or essential attributes thereof and, accordingly, reference should be made to the appended claims, rather than to the foregoing specification as indicating the scope of the invention.

We claim:

1. A process for aerosolizing a liquid which comprises pressurizing a gas to a pressure above 1.5 atmospheres, warming the liquid to a temperature above ambient temperature conditions, pressurizing the liquid to a predetermined flowrate, heating the warmed pressurized liquid to an elevated temperature at which said liquid will become aerosolized upon engagement with said gas, maintaining said liquid at said elevated temperature for a very short time period, releasing said gas at a velocity at least as great as the speed of sound, discharging said heated liquid about said stream of gas, impinging the rapidly moving stream of gas upon a barrier and deflecting it at an angle to its normal direction of movement whereby the discharged heated liquid is aerosolized into aerosol particles within a narrow particle size range, and selectively classifying any relatively large particles from said aerosol particles.

2. A process for aerosolizing a liquid which comprises pressurizing a gas to a pressure above 1.5 atmospheres, heating the gas to a predetermined temperature, warming the liquid to a temperature above ambient temperature conditions and below the temperature of the heated gas, pressurizing the liquid to a predetermined flow rate, heating the warmed pressurized liquid to an elevated temperature below the temperature of the heated gas at which elevated temperature said liquid will become aerosolized upon engagement with said gas, maintaining said liquid at said elevated temperature for a very short time period, releasing said gas as a stream at a velocity at least as great as the speed of sound, discharging said heated liquid about said stream of gas, impinging the rapidly moving stream of gas upon a barrier and deflecting it at an angle to its normal direction of movement whereby the discharged heated liquid is aerosolized into aerosol particles within a narrow particle size range, and selectively classifying any relatively large particles from said aerosol particles.

3. A process for aerosolizing a liquid which comprises pressurizing a gas to a pressure above 1.5 atmospheres, cooling the said gas to a temperature appreciably below ambient temperature conditions, warming the liquid to a temperature above ambient temperature conditions, pressurizing the liquid to a predetermined flow rate, heating the warmed pressurized liquid to an elevated temperature, maintaining said liquid at said elevated temperature for a very short time period, releasing said cooled gas as a stream at a velocity at least as great as the speed of sound, discharging the heated liquid about said stream of gas, impinging the rapidly moving stream of gas upon a barrier and deflecting it at an angle to its normal direction of movement whereby the discharged heated liquid is aerosolized into aerosol particles within a narrow particle size range, and selectively classifying any relatively large particles from said aerosol particles.

4. A process for aerosolizing a liquid which comprises pressurizing a gas to a pressure above 1.5 atmospheres, warming the liquid to a temperature above ambient temperature conditions, pressurizing the liquid to a predetermined flow rate, heating the warmed pressurized liquid to an elevated temperature at which said liquid will become aerosolized upon engagement with said gas, maintaining said liquid at said elevated temperature for a very short time period, releasing said gas as a stream at a velocity at least as great as the speed of sound, discharging said heated liquid about said stream of gas, impinging the rapidly moving stream of gas upon a barrier and deflecting it at an angle to its normal direction of movement whereby the discharged heated liquid is aerosolized into aerosol particles within a narrow particle size range, contacting said aerosolized particles with an upwardly moving stream of gas, and selectively classifying any relatively large particles from said aerosol particles.

5. A process for aerosolizing a liquid which comprises pressurizing a gas to a pressure above 1.5 atmospheres, warming the liquid to a temperature above ambient temperature conditions, pressurizing the liquid to a predetermined flow rate, heating the warmed pressurized liquid to an elevated temperature at which said liquid will become aerosolized upon engagement with said gas, maintaining said liquid at said elevated temperature for a very short time period, releasing said gas as a stream at a velocity at least as great as the speed of sound, discharging said heated liquid about said stream of gas, impinging the rapidly moving stream of gas upon a barrier and deflecting it at an angle to its normal direction of movement whereby the discharged heated liquid is aerosolized into aerosol particles within a narrow particle size range, selectively classifying any relatively large particles from said aerosol particles, and contacting said aerosolized particles with an angularly directed stream of gas.

6. A process for aerosolizing a liquid surface active agent which comprises pressurizing a gas to a pressure above 1.5 atmospheres, warming the liquid surface active agent to a temperature above ambient temperature conditions, pressurizing the liquid surface active agent to a pedetermined flow rate, heating the warmed pressurized liquid surface active agent to an elevated temperature at which said liquid surface active agent will become aerosolized upon engagement with said gas, maintaining said liquid surface active agent at said elevated temperature for a very short time period, releasing said gas as a stream at a velocity at least as great as the speed of sound, discharging said heated liquid surface active agent about said stream of gas, impinging the rapidly moving stream of gas upon a barrier and deflecting it at an angle to its nomal direction of movement whereby the discharged heated liquid is aerosolized to aerosol particles within a narrow particle size range, and selectively classifying any relatively large particles from said aerosol particles.

7. A process in accordance with claim 6 in which the liquid surface active agent is a non-ionic surface active agent.

8. A process in accordance with claim 7 in which the nonionic surface active agent is polyoxyethylene sorbitan monolaurate.

9. A process for aerosolizing a liquid which comprises pressurizing a gas to a pressure above 1.5 atmospheres, warming the liquid to a temperature above ambient temperature conditions, pressurizing the liquid to a predetermined flow-rate, heating the warmed pressurized liquid to an elevated temperature at which said liquid will become aerosolized upon engagement with said gas, maintaining said liquid at said elevated temperature for a very short time period, releasing said gas at a velocity at least as great as the speed of sound, discharging said heated liquid about said stream of gas, impinging the rapidly moving stream of gas upon a barrier and deflecting it at an angle to its normal direction of movement whereby the discharged heated liquid is aerosolized into aerosol particles within a narrow particle size range, selectively classifying relatively large particles from said aerosol particles, separately withdrawing the aerosolized particles, collecting the classified large liquid particles, and recycling said collected liquid.

10. An aerosolization process comprising upwardly discharging a stream of gas at a velocity at least as great as the speed of sound, enveloping said upwardly moving stream of gas with an upwardly moving stream of liquid, impinging the rapidly moving stream of gas upon a barrier and deflecting it at an angle to its normal direction of movement, the deflection of the gas stream radically distorting the enveloping stream of liquid and aerosolizing the stream of liquid into aerosol particles within a narrow particle size range, removing said aerosol particles overhead, and withdrawing downwardly falling large particles.

11. An aerosolization process in accordance with claim 10 in which an upwardly moving second stream of gas is directed from a source beneath the point of origin of the moving stream of gas, said second stream of gas serving to aid in the upward movement of the aerosol particles.

12. An aerosolization process in accordance with claim 10 in which the withdrawn large particles are collected and recycled to be aerosolized with the upwardly moving stream of gas.

13. An aerosolization process in accordance with claim 10 in which the liquid comprises a surface active agent.

14. An aerosolization process in accordance with claim 13 in which the surface active agent is a nonionic agent.

15. An aerosolization process in accordance with claim 14 in which the nonionic surface agent is polyoxyethylene sorbitan monolaurate.

16. An aerosolization process in accordance with claim 10 in which the liquid comprises molten sulfur.

17. An aerosolization process in accordance with claim 10 in which the liquid comprises a molten wax.

18. An aerosolization process in accordance with claim 10 in which the liquid comprises dichloro-diphenyl-trichloroethane.

19. An aerosolization process in accordance with claim 10 in which the liquid comprises a hydrocarbon oil.

20. Aerosolization apparatus comprising in combination means for pressurizing a gas to a pressure above 1.5 atmospheres, a first liquid heating means, means in liquid communication with said first liquid heating means for pressurizing the liquid to a predetermined flow rate, a second liquid heating means for heating a liquid above the temperature to which said liquid may be heated by said first liquid heating means in liquid communication with said liquid pressurizing means, nozzle means in communication with said gas pressurizing means and said second liquid heating means for discharging said gas as a high velocity stream encompassed within a liquid envelope, said nozzle means including a barrier for deflecting the rapidly moving gas stream and aerosolizing the heated liquid into aerosol liquid particles, classification means for separating relatively large liquid particles from the aerosol liquid particles, and a conduit for recycling said separated relatively large particles to said first liquid heating means.

21. Aerosolization apparatus comprising in combination means for pressurizing a gas to a pressure above 1.5 atmospheres, gas heating means in gas communication with said gas pressurizing means for heating the gas to an elevated temperature, a first liquid heating means, means in liquid communication with said first liquid heating means for pressurizing the liquid to a predetermined flow rate, a second liquid heating means for heating a liquid above the temperature to which the liquid may be heated by said first liquid heating means in liquid communication with said liquid pressurizing means, nozzle means in communication with said gas heating means and said second liquid heating means discharging said gas as a high velocity stream encompassed within a liquid envelope, said nozzle means including a barrier for deflecting the rapidly moving gas stream and aerosolizing the heated liquid into aerosol liquid particles, and classification means for separating relatively large liquid particles from the aerosol liquid particles.

22. Aerosolization apparatus in accordance with claim 21 in which the second liquid heating means is constructed to heat the liquid to a temperature below the temperature to which the gas heating means heats the gas.

23. Aerosolizaion apparatus comprising in combination means for pressurizing a gas to a pressure above 1.5 atmospheres, a first liquid heating means, means in liquid communication with said first liquid heating means for pressurizing the liquid to a predetermined flow rate, a second liquid heating means for heating a liquid above the temperature to which said liquid may be heated by said first liquid heating means in liquid communication with said liquid pressurizing means, nozzle means in communication with said gas pressurizing means and said second liquid heating means for discharging said gas as a high velocity stream encompassed within a liquid envelope, said nozzle means including a barrier for deflecting the rapidly moving gas stream and aerosolizing the heated liquid into aerosol liquid particles, said nozzle means being directed upwardly so that the aerosol liquid particles are discharged above the nozzle means, classification means for separating relatively large liquid particles from the aerosol liquid particles, and collection means for collecting the large liquid particles beneath said nozzle means.

24. Aerosolization apparatus comprising in combination means for pressurizing a gas to a pressure above 1.5 atmospheres, a first liquid heating means, means in liquid communication with said first liquid heating means for pressurizing the liquid to a predetermined flow rate, a second liquid heating means for heating a liquid above the temperature to which said liquid may be heated by said first liquid heating means in liquid communication with said liquid pressurizing means, nozzle means in communication with said gas pressurizing means and said second liquid heating means for discharging said gas as a high velocity stream encompassed within a liquid envelope, said nozzle means including a barrier for deflecting the rapidly moving gas stream and aerosolizing the heated liquid into aerosol liquid particles, said nozzle means being directed upwardly so that the aerosol liquid particles are discharged above the nozzle means, a gas source and impelling means beneath said nozzle means for providing an upwardly directed gas stream for aiding the upward movement of the aerosol particles, classification means for separating relatively large liquid particles from the aerosol liquid particles, and collection means for collecting the large liquid particles beneath said nozzle means.

25. Aerosolization apparatus comprising in combination means for pressurizing a gas to a pressure above 1.5 atmospheres, a first liquid heating means, means in liquid communication with said first liquid heating means for pressurizing the liquid to a predetermined flow rate, a second liquid heating means for heating a liquid above the temperature to which said liquid may be heated by said first liquid heating means in liquid communication with said liquid pressurizing means, nozzle means in communication with said gas pressurizing means and said second liquid heating means for discharging said gas as a high velocity stream encompassed within a liquid envelope, said nozzle means including a barrier for deflecting the rapidly moving gas stream and aerosolizing the heated liquid into aerosol liquid particles, said nozzle means being directed upwardly so that the aerosol liquid particles are discharged above the nozzle means, a further gas source angularly positioned to the upwardly moving stream of aerosol particles for laterally deflecting the aerosol particle stream, a gas source and impelling means beneath said nozzle means for providing an upwardly directed gas stream for aiding the upward movement of the aerosol particles, classification means for separating relatively large liquid particles from the aerosol liquid particles, and collection means for collecting the large liquid particles beneath said nozzle means.

References Cited in the file of this patent

UNITED STATES PATENTS

| | | |
|---|---|---|
| 159,512 | Henderson | Feb. 9, 1875 |
| 1,150,238 | Winbray | Aug. 17, 1915 |
| 2,364,145 | Huppke et al. | Dec. 5, 1944 |
| 2,437,963 | Langmuir et al. | Mar. 16, 1948 |
| 2,477,947 | Yadoff | Aug. 2, 1949 |